United States Patent [19]

Fallon

[11] Patent Number: 4,583,889
[45] Date of Patent: Apr. 22, 1986

[54] JIG FOR LOCATING DRILLING HOLES IN WOOD PANELS

[75] Inventor: Regis Fallon, Noisy Le Grand, France

[73] Assignee: La Francaise Metallurgie, Paris, France

[21] Appl. No.: 650,878

[22] Filed: Sep. 17, 1984

[30] Foreign Application Priority Data

Dec. 20, 1983 [FR] France .................. 83 20408

[51] Int. Cl.⁴ .................................. B23B 47/28
[52] U.S. Cl. ................... 408/115 R; 408/72 R; 408/97; 408/108
[58] Field of Search .............. 408/72 R, 72 B, 87, 408/88, 91, 94, 99, 115 R, 115 B, 241 R, 241 B, 103, 108, 97; 33/189 R, 168 B, 185 R

[56] References Cited

U.S. PATENT DOCUMENTS

| | | | |
|---|---|---|---|
| 1,161,479 | 11/1915 | Kelley | 408/109 |
| 1,269,811 | 6/1918 | Heritage | 408/109 |
| 2,583,283 | 1/1952 | Volz | 408/115 R X |
| 2,838,966 | 6/1958 | Campbell | 408/115 R |
| 3,273,426 | 9/1966 | Cleveland | 408/109 |
| 3,708,237 | 1/1973 | Kruse | 408/115 R |
| 4,137,003 | 1/1979 | Budoff | 408/115 R X |
| 4,145,160 | 3/1979 | Wiggins | 408/115 R X |
| 4,176,989 | 12/1979 | Wolff | 408/72 R X |
| 4,218,161 | 8/1980 | Zolkind | 408/115 B X |
| 4,448,572 | 5/1984 | Gill | 408/115 R |

FOREIGN PATENT DOCUMENTS

| | | | |
|---|---|---|---|
| 2750869 | 5/1979 | Fed. Rep. of Germany | 408/241 B |
| 3020970 | 6/1980 | Fed. Rep. of Germany | |
| 2071537 | 2/1980 | United Kingdom | |

Primary Examiner—Gil Weidenfeld
Assistant Examiner—Glenn L. Webb
Attorney, Agent, or Firm—Staas & Halsey

[57] ABSTRACT

A jig for locating holes to be drilled in two panels (P1, P2), in particular wood panels, for assembling the panels at right angles to each other by means of dowels (82) lodged in the holes. The jig comprises a housing (10) having two perpendicular branches (14, 16) each of which slidably receives a corresponding plate having a drilling bush (32, 34) passing therethrough, and means (68) for moving the two plates in synchronism with one another as a function of the thickness of the panels.

10 Claims, 13 Drawing Figures

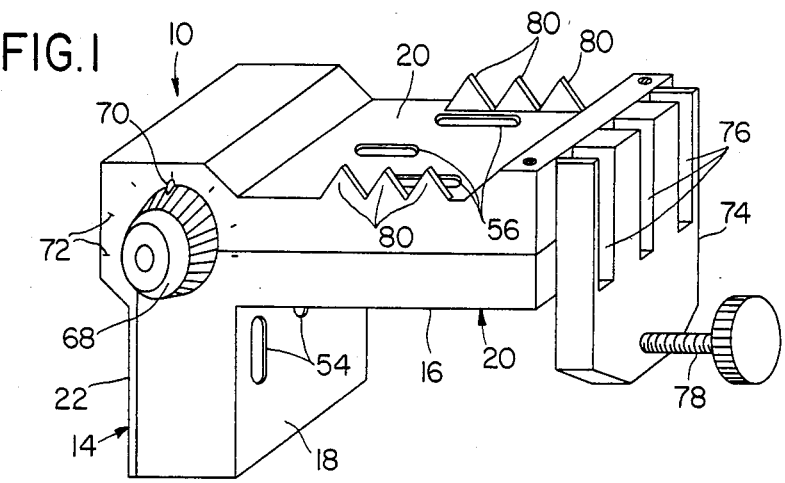
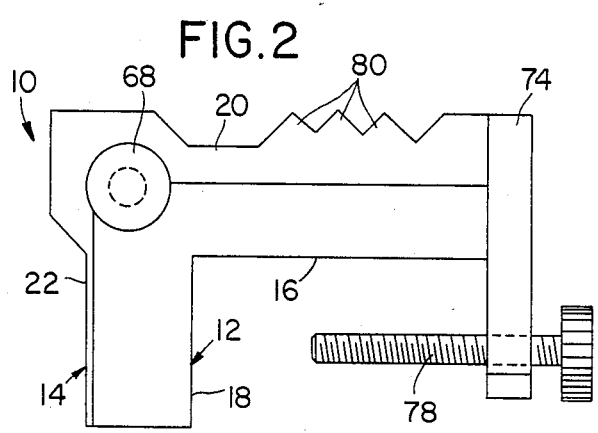
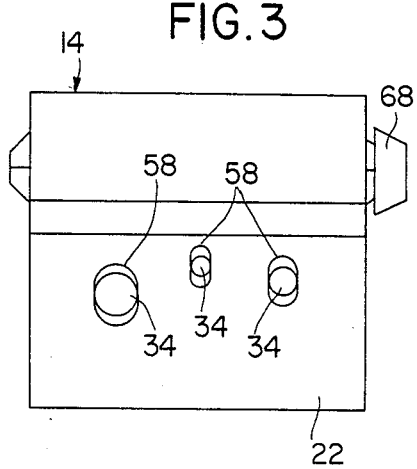
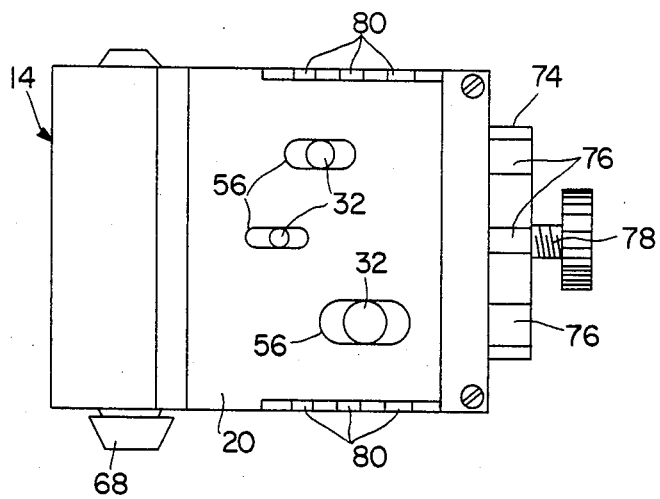

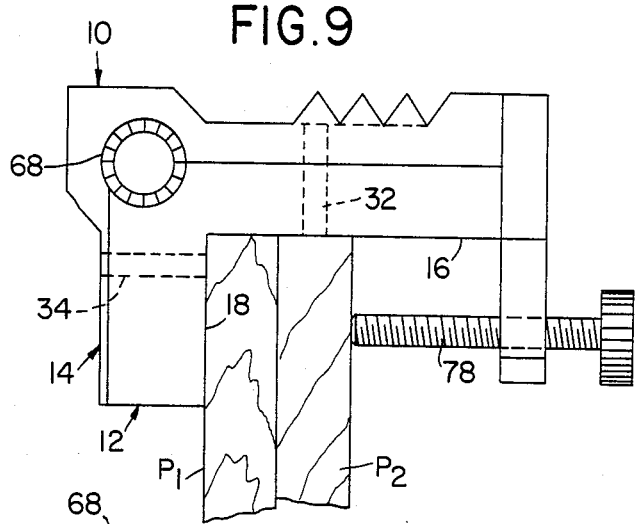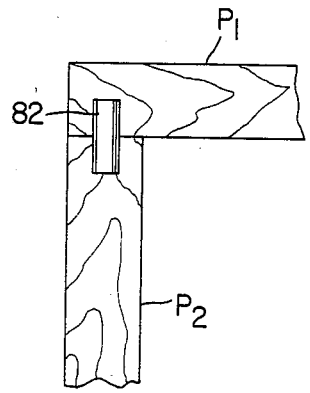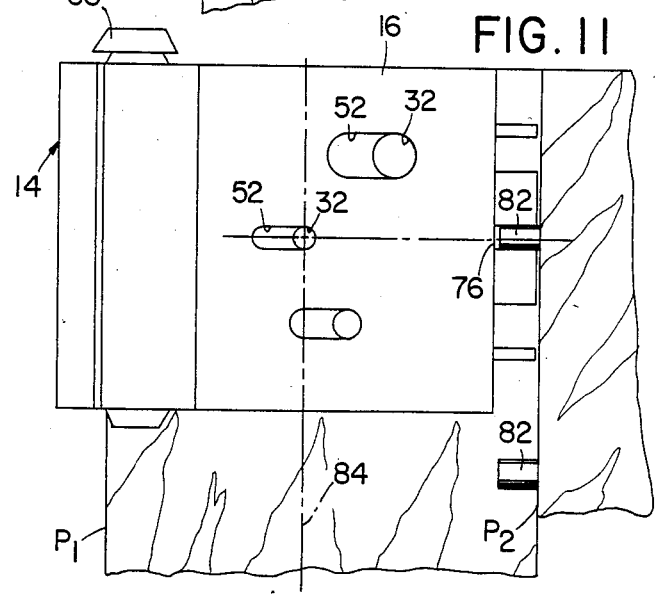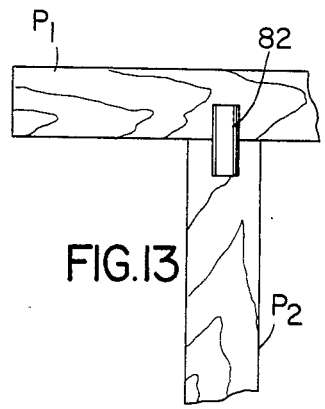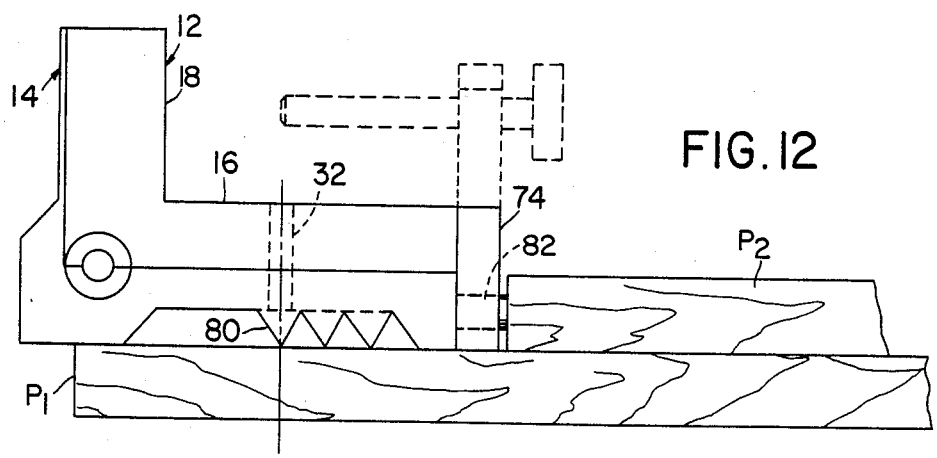

JIG FOR LOCATING DRILLING HOLES IN WOOD PANELS

The invention relates to a jig for locating drilling holes in pairs of panels, and in particular in wood panels, in order to assembly the panels at right angles to each another at L- or T-joints by means of dowels located in the holes.

BACKGROUND OF THE INVENTION

When two panels are to be joined perpendicularly to one another in this manner, e.g. at an L-joint, it is necessary to drill holes in the edge of one of the panels, to drill holes in a large face of the other panel, to push dowels over half their length into the holes made in one of the panels, to bring the other panel into a perpendicular relationship with the first making sure that the holes in the other panel are aligned with the dowels in the first panel, and to insert the free halves of the dowels into the holes made in the other panel. In order to ensure that the panels can be assembled to one another and that the edge of one of the panels lies exactly in the plane of a large face of the other panel, the various holes in the panels must match exactly and must be at a determined distance from the edge of each panel. Any error in measuring or marking the axes of the holes to be drilled makes it impossible to assemble the panels correctly.

Preferred embodiments of the invention provide a jig for locating the holes to be drilled in the various panels and for drilling the holes, with reduced risk of error, and without it being necessary to make prior measurements and markings for locating the axes of the holes to be drilled in the panels.

SUMMARY OF THE INVENTION

A jig in accordance with the invention has the improvement wherein it comprises a housing having two perpendicular branches, two plates having drilling bushes, each plate being slidably mounted on a corresponding branch of the housing, and means for moving the two plates in synchronism with one another, as a function of the thickness of the panels.

The positions of both of the plates with drilling bushes are thus adjusted by means of a single command as a function of the thickness of the panels. Once the adjustment has been made, the jig is placed like a carpenter's square over the ends of two superposed panels at the point where a first dowel is to be installed. Holes are drilled in the panels by inserting a drill bit through the chosen bush through a first one of the plates and then through the corresponding bush in the other plate. The jig is then moved to the point chosen for the second dowel and two more holes are drilled as before.

The only operation required prior to drilling the holes is thus adjusting the jig as a function of the thickness of the panels, and this may be done by eye without taking measurements.

The panels can then be accurately assembled to each other without running the risk of errors.

The means for enabling both plates to be moved in synchronism preferably comprise a cam shaft lodged in the housing at the junction between the two branches thereof, together with resilient return means urging the plates against the cams.

The cams may be of smoothly varying profile to enable the jig to be continuously variable as a function of the thickness of the panels, or alternatively, the cam may be stepped to provide settings for panels of predetermined thicknesses.

Advantageously, one of the branches of the housing includes grooves at its free end, with each groove being associated with a drilling bush of the corresponding plate, and with the width of each groove being equal to the diameter of the corresponding drilling bush. The outside of this branch of the housing may include reference marks which are aligned in pairs perpendicularly to the direction of movement of the corresponding plate and lying on the axes of corresponding drilling bushes when the plate is in a predetermined position, e.g. at the end of its stroke.

The jig can then be used for assembling two panels in a T-joint, i.e. the panels are perpendicular to each other, but the edge of the cross bar panel does not lie in the same plane as one of the faces of the other panel.

BRIEF DESCRIPTION OF THE DRAWINGS

An embodiment of the invention is described by way of example with reference to the accompanying drawings, in which:

FIG. 1 is a diagrammatic perspective view of a jig in accordance with the invention;

FIGS. 2, 3, and 4 are respectively a side view, an end view and a top view of the jig;

FIGS. 9 and 10 are diagrams showing how the jig is used to assemble two panels at an L-joint; and FIGS. 11 to 13 are diagrams showing how the jig is used to assemble two panels at a T-joint.

MORE DETAILED DESCRIPTION

Figure 5:
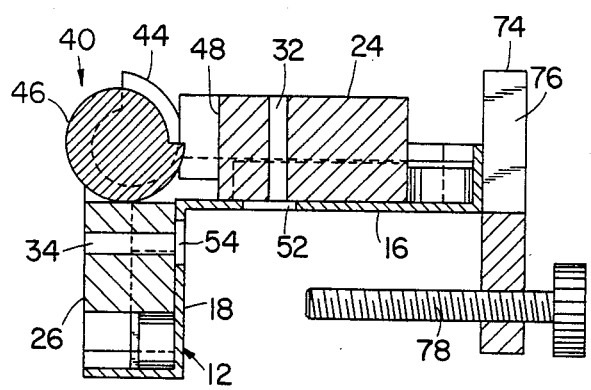
FIG. 5 is a section on a line V—V in FIG. 7, showing the jig with its cover removed.

Reference is made initially to FIGS. 1 to 7 which show the structure of a jig in accordance with the invention.

The jig comprises a housing 10, e.g. made of metal, having two perpendicular branches in the general form of a carpenters' square or L-shape. The housing is made up from an inside L-shaped half 12 and an outside L-shaped half or cover 14 which is screwed to the inner half 12.

The inside half 12 of the housing has a first branch 16 and a second branch 18 perpendicular to the first. Taking the orientation of the jig as shown in the figures as a guide, the first branch 16 is referred to hereinafter as the "horizontal" branch, while the second branch 18 is referred to as the "vertical" branch. Likewise, the cover 14 has a first or horizontal branch 20 and a second or vertical branch 22.

Two plates 24 and 26 (see FIGS. 5 to 7) are slidably mounted in respective ones of the branches of the housing 10. The interior faces of both branches 16 and 18 of the inner half 12 of the housing have thin, inwardly-projecting and longitudinally-extending ribs 28 and 30 respectively which are received in corresponding grooves in the plates 24 and 26, and which serve to guide the plates in translation.

Each plate 24, 26 is provided with drilling bushes 32, 34 respectively, with each plate having a plurality of drilling bushes of different diameters corresponding to various standard sizes of dowel used for assembling panels: for example, the bushes there may be three bushes of 6 mm, 8 mm and 10 mm diameters respectively in a metric system; or four holes of ¼", 5/16", ⅜" and ½" diameter respectively in a British or U.S. system.

Figure 7:
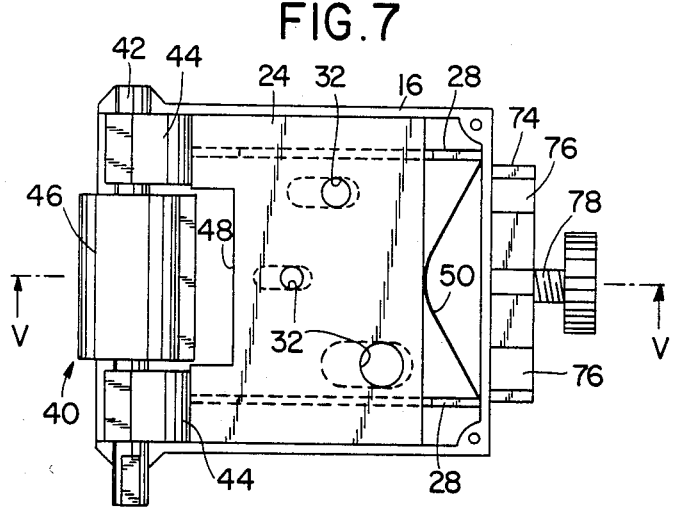
FIG. 7 is a top view of the jig with its cover removed.

The axes of the drilling bushes 32 and 34 provided through the plates 24 and 26 are contained in corresponding pairs in parallel planes which extend perpendicular to both branches of the housing, i.e. in planes parallel to the section plane V—V shown in FIG. 7. Another way of defining the orientation of these parallel planes is to specify that they contain the directions of movement of both of the plates 24 and 26.

Thus, the axes of two drilling bushes having the same diameter through respective ones of the plates 24 and 26 are perpendicular to each other and are contained in a single one of the above-mentioned planes.

The plates 24 and 26 are moved in translation perpendicularly to each other inside the branches of the housing 10 by means of a cam shaft 40 lodged inside the housing 10 at the joint between its two branches.

The cam shaft 40 comprises a shaft 42 having its ends rotatably received in bearings each of which is built up from a pair of half bearings with one half of each bearing being located in the inside half 12 of the housing 10 and the other half of each bearing being located in the cover 14. Three cams are fixed to the shaft 42: two ends cams 44 which co-operate with the plate 24; and a middle cam 46 which co-operates with the other plate 26 and which is free to move in a cut-out 48 in the corresponding end of the first plate 24. The plates 24, 26 are resiliently urged against the corresponding cam 44, 46 by respective spring blades 50 located between the ends of the plates which are distant from the cams and the end walls of the inside half 12 of the housing 10.

Elongate slots or openings 52, 54 are formed in the large faces of the branches 16 and 18 of the inside half 12 of the housing 10 opposite respective ones of the drilling bushes 32 and 34. The slots extend parallel to the direction of movement of the corresponding plate 24 or 26, i.e. perpendicularly to the axis of the cam shaft 40. Similar elongate slots or openings 56 and 58 are formed in the large faces of the cover 14 corresponding to the slots 52 and 54 through the inside half 12. Each slot or opening 42, 54, 56, 58 is at least as long as the stroke of the corresponding plate 24 or 26 and its width is at least equal to the diameter of the corresponding drilling bush 32 or 34.

It may be observed that the drilling bushes of different diameters through the plates 24 and 26 are located in such a manner that the smaller diameter holes are closer to the cam shaft 40 than the larger diameter holes. This is to allow for smaller diameter dowels being used with thinner plates and larger diameter dowels being used with thicker plates.

The outer cams 44 are offset on the cam shaft 40 by 90° from the middle cam 46, and the profiles of the cams are chosen in such a manner that for a given rotation of the cam shaft 40, the cams 44 move the plate 24 three times as far as the cam 46 moves the plate 26.

Figure 6:
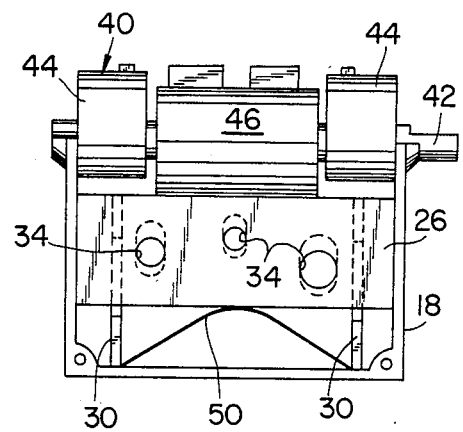
FIG. 6 is an end view of the jig with the cover removed.

If the cams have a smoothly varying profile, as shown in FIGS. 5 to 7, then the cam shaft 40 is associated with means for locking the shaft in a desired angular position, e.g. a locking screw.

Figure 8:
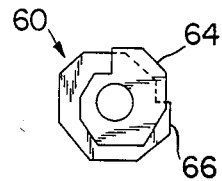
FIG. 8 is an end view of a variant cam shaft.

In a variant as shown in FIG. 8, a cam shaft 60 has cams 64 and 66 (corresponding to the cam shaft 40 and its cams 44 and 46) which have a stepped profile, such that each pair of cam steps corresponds to panels of a predetermined thickness.

With reference to FIGS. 1 to 4, it can be seen that one end of the cam shaft 40 projecting outside the housing 10 is fitted with a knob 68 for rotating the cam shaft and incorporating an index mark 70 which moves over a scale 72 on the exterior surface of the housing 10 and graduated in panel thicknesses.

The free end of the horizontal branch 16 of the inside half 12 of the housing 10 may be fitted with an end piece 74 defining three vertical grooves 76 each of which is aligned with a corresponding one of the above-mentioned pairs of slots 52 or 56 and which is of the same width as the drilling bushes that open out into the corresponding slots. The bottom end of the piece 74 is additionally provided with a tapped bore for receiving a threaded rod 78 or predetermined length for clamping the panels to be drilled against the large face of the vertical branch 18 of the inside half 12 of the housing 10 (see FIG. 9). The outside end of the threaded rod 78 is provided with a conventional knob to facilitate tightening and untightening the rod.

Teeth 80 project upwardly from the top face of the horizontal branch 20 of the cover 14. These teeth lie in the same plane as the sides of the horizontal branch 20 and they extend to a point close to the end of the horizontal branch. The teeth 80 are triangular and they are aligned in pairs on axes parallel to the cam shaft axis such that when the plate 24 is in a predetermined position, e.g. at the end of its stroke, the axis of each of the drilling bushes 32 through the plate 24 lies on a line joining a corresponding pair of tooth points together. The function of the teeth 80 is explained below with reference to FIGS. 11 to 13.

Operation of the jig is initially described with reference to FIGS. 9 and 10 which relate to an L-joint between two panels P1 and P2 of the same thickness.

As can be seen in FIG. 10, when the panels P1 and P2 are assembled to each other at an L-joint by means of dowels 82, the dowels 82 are lodged in holes formed in the edge of the panel P2 and in the large face of the panel P1. The axes of the holes in the edge of the panel P2 lie substantially in the mid plane of the panel, while the axes of the holes in the panel P1 must be located at a distance from the end of the panel equal to one half the thickness of the panels.

The panels P1 and P2 are superposed on each other as shown in FIG. 9, and the housing 10 is placed like a carpenters' square over the ends of both panels, and is fixed in place by means of the screw 78. Drilling bushes 32 and 34 of diameter appropriate to the thickness of the panels are chosen, and the knob 68 on the cam shaft 40 is turned one way or the other to bring the chosen hole 32 substantially into the middle of the edge of the panel P2. The jig is so constructed that the distance between the axis of the drilling bush 32 and the vertical arm 18 of the inside half 12 of the housing 10 is equal to one panel thickness plus the distance between the axis of the corresponding drilling bush 34 and the horizontal branch 16 of the inside half 12.

Once the jig is adjusted as a function of the thickness of the panels, a drill bit or the like is inserted into the drilling bush 32 and a hole of desired depth is drilled into the end of the panel P2; a hole is also drilled in like manner through the drilling bush 34 to a desired depth into the large face of the panel P1.

The jig is then moved along the edges of the two panels and two more holes are drilled in like manner.

When enough pairs of dowel-receiving holes have been drilled, the dowels are inserted into one set of holes, e.g. those in the edge of the panel P2, the corresponding holes drilled in the large face of the panel P1 are then moved opposite the ends of the dowels, and the panels are pressed together. The jig in accordance with the invention ensures that the edge of the panel P1 will be exactly aligned with the outside large face of the panel P2, and that the drilled holes are properly aligned in pairs, regardless of the thickness of the panels.

FIGS. 11 and 12 show how to make a T-joint such as the joint shown in FIG. 13.

A line 84 is marked on the large face of the panel P1 where it is to be joined to the edge of the panel P1. The panels P1 and P2 are then juxtaposed and the jig is fixed to the end edges of the panels as shown in FIG. 9 (already described in relation to the L-joint). All the necessary holes are then drilled in the end edge of the panel P2, but no holes are drilled in the panel P1.

Dowels 82 are then inserted in the holes in the edge of the panel P2, and the panel P1 is placed so that its face which is to be drilled lies uppermost. The jig is turned upsidedown so that its vertical branch rises from its horizontal branch, and its horizontal branch is placed against the panel P1 so that the tips of the teeth 80 corresponding to the chosen hole diameter lie on the line 84 designated the axis on which holes are to be drilled in the panel P1. The panel P2 is placed on the panel P1 with its dowels 82 pointing towards the jig and with the sides of the two panels in alignment, as shown in FIG. 11. The jig is moved along the line 84 on the panel P1 until a first dowel at the end of the panel P2 can be inserted into the groove 76 of corresponding diameter in the end piece 74. In this position the dowel 82 is aligned with the opening 52 into which opens out the drilling bush 32 of the selected diameter. A hole of the desired depth is then drilled in the panel P1 by a drill bit passed through the said bush 32.

The jig is then moved along the line on the panel P1 until the next dowel can be inserted in the vertical groove 76 of corresponding diameter, and the next hole is drilled in the panel P1, etc.

A jig in accordance with the invention can be used to drill dowel-receiving holes in panels of different thicknesses, either by means of additional adjustments of the jig, or else by using packing to make up the missing thickness.

I claim:

1. A jig for locating holes to be drilled in two panels, in particular wood panels, for assembling the panels at right angles to each other by means of dowels lodged in the holes, the improvement wherein the jig comprises a housing having two perpendicular branches each of which slidably receives a corresponding plate having a drilling bush passing therethrough, and a mechanism contained in said housing and having a single control means for moving the two plates in synchronism with each other as a function of the thickness of the panels.

2. A jig according to claim 1, wherein said mechanism comprises a cam shaft lodged in the housing at the junction between the two branches thereof, together with resilient return means urging the plates against the cams.

3. A jig according to claim 2, wherein the cams are of smoothly varying profile to enable the jig to be continuously variable as a function of the thickness of the panels.

4. A jig according to claim 2, wherein the cams are stepped to provide specific settings for panels of predetermined thicknesses.

5. A jig according to claim 1, wherein the inside faces of the two branches of the housing constitute bearing faces, one of which is applied against one face of a first one of the panels, and the other of which is applied against the juxtaposed end edges of the said first panel and of the second one of the said two panels when said panels are superposed on each other.

6. A jig according to claim 5, wherein the said means for moving the two plates in synchronism with each other are adjusted to move one of the plates three times as fast as the other plate.

7. A jig according to claim 1, wherein each of the sliding plates includes a plurality of drilling bushes of different diameters, the axes of two drilling bushes of the same diameter in the two different plates being contained in the same plane which is extends parallel to the directions of movement of both plates.

8. A jig according to claim 1, wherein one of the branches of the housing includes grooves at its free end, with each groove being associated with a drilling bush of the corresponding plate, and with the width of each groove being equal to the diameter of the corresponding drilling bush.

9. A jig according to claim 8, wherein the outside of the said one of the branches of the housing includes reference marks which are aligned in pairs perpendicularly to the direction of movement of the corresponding plate and which lie on the axes of corresponding drilling bushes when the plate is in a predetermined position, e.g. at the end of its stroke.

10. A jig according to claim 1, wherein one branch of the housing includes screw means for fixing the jig to the two panels when superposed, and for clamping the superposed panels against the other one of the branches.

* * * * *